United States Patent
Hishinuma et al.

(10) Patent No.: US 11,365,324 B2
(45) Date of Patent: Jun. 21, 2022

(54) ACTIVE-ENERGY-RAY CURABLE OFFSET PRINTING INK COMPOSITION, AND METHOD FOR MANUFACTURING PRINTED MATTER AND METHOD FOR ENHANCING GLOSS OF PRINTED MATTER USING THE SAME

(71) Applicant: SAKATA INX CORPORATION, Osaka (JP)

(72) Inventors: Keishiro Hishinuma, Osaka (JP); Naoki Omi, Osaka (JP)

(73) Assignee: SAKATA INX CORPORATION, Osaka (JP)

( * ) Notice: Subject to any disclaimer, the term of this patent is extended or adjusted under 35 U.S.C. 154(b) by 0 days.

(21) Appl. No.: 16/768,548

(22) PCT Filed: Dec. 6, 2018

(86) PCT No.: PCT/JP2018/044848
§ 371 (c)(1),
(2) Date: May 29, 2020

(87) PCT Pub. No.: WO2019/111985
PCT Pub. Date: Jun. 13, 2019

(65) Prior Publication Data
US 2020/0317938 A1 Oct. 8, 2020

(30) Foreign Application Priority Data

Dec. 7, 2017 (JP) .............................. JP2017-234750
Mar. 5, 2018 (JP) .............................. JP2018-039154

(51) Int. Cl.
*C08F 2/46* (2006.01)
*C08F 2/50* (2006.01)
*C08G 61/04* (2006.01)
*C09D 11/101* (2014.01)
*B41M 5/00* (2006.01)
*B41M 7/00* (2006.01)
*C09D 11/107* (2014.01)

(52) U.S. Cl.
CPC ......... *C09D 11/101* (2013.01); *B41M 5/0023* (2013.01); *B41M 7/0018* (2013.01); *C09D 11/107* (2013.01)

(58) Field of Classification Search
CPC .... B41M 7/0018; B41M 7/00; B41M 5/0023; C09D 11/107; C09D 11/101
USPC ........... 522/39, 33, 6, 189, 184, 71, 1; 520/1
See application file for complete search history.

(56) References Cited

U.S. PATENT DOCUMENTS

| | | | | |
|---|---|---|---|---|
| 3,803,109 | A | * | 4/1974 | Nemoto ............... C08G 18/675 522/40 |
| 4,409,077 | A | * | 10/1983 | Sakiyama ............... C08F 20/36 522/103 |
| 6,001,444 | A | | 12/1999 | Koide et al. |
| 2003/0054103 | A1 | | 3/2003 | Sato et al. |
| 2017/0009059 | A1 | | 1/2017 | Morikawa et al. |

FOREIGN PATENT DOCUMENTS

| | | | |
|---|---|---|---|
| CN | 102736415 A | | 10/2012 |
| CN | 104487528 A | | 4/2015 |
| JP | 2002-293832 | * | 10/2002 |
| JP | 2002293832 A | | 10/2002 |
| JP | 2002-363446 | * | 12/2002 |
| JP | 2002363446 A | | 12/2002 |
| JP | 2003-064288 | * | 3/2003 |
| JP | 2003064288 A | | 3/2003 |
| JP | 2003-119230 | * | 4/2003 |
| JP | 2003119230 A | | 4/2003 |
| JP | 2004-131613 | * | 4/2004 |
| JP | 2004131613 A | | 4/2004 |
| JP | 2004-359767 | * | 12/2004 |
| JP | 2004359767 A | | 12/2004 |
| JP | 2005-014755 | * | 1/2005 |
| JP | 2005015755 A | | 1/2005 |
| JP | 2006169412 A | | 6/2006 |
| JP | 2007-045104 | * | 2/2007 |
| JP | 2007045104 A | | 2/2007 |
| JP | 2007-056185 | * | 3/2007 |
| JP | 2007056185 A | | 3/2007 |

(Continued)

OTHER PUBLICATIONS

Iwase et al, JP 2003-064288 Machine Translation, Mar. 5, 2003 (Year: 2003).*
Akimoto et al, JP 2008-143993 Machine Translation, Jun. 26, 2008 (Year: 2008).*
Sato et al, JP 2002-293832 Machine Translation, Oct. 9, 2002 (Year: 2002).*
Sato, JP 2002-363446 Machine Translation, Dec. 18, 2002 (Year: 2002).*
Sato, JP 2003-119230 Machine Translation, Apr. 23, 2003 (Year: 2003).*
Iida et al, JP 2004-131613 Machine Translation, Apr. 30, 2004 (Year: 2004).*
Matsunami et al, JP 2004-359767 Machine Translation, Dec. 24, 2004 (Year: 2004).*

(Continued)

*Primary Examiner* — Jessica Whiteley
(74) *Attorney, Agent, or Firm* — Alleman Hall Creasman & Tuttle LLP

(57) ABSTRACT

Provided is an active energy ray-curable ink composition for offset printing capable of achieving superior gloss of printed matter. The ink composition comprises a compound having at least one ethylenically unsaturated bond and a photopolymerization initiator, wherein a group of materials having no ethylenically unsaturated bonds, having a specified SP value, and exhibiting a liquid state at room temperature is added to the ink composition up to the upper limit depending on the SP value. Examples of such a group of materials include castor oil, hardened castor oil, polymerized castor oil, coconut oil, palm kernel oil, epoxidized fats and oils, alkylphenols having C15-C18 alkyl groups, cashew nut shell liquid, polymers of cashew nut shell, and modified derivatives of cashew nut shell liquid.

4 Claims, No Drawings

(56) References Cited

FOREIGN PATENT DOCUMENTS

| JP | 2008-143993 | * | 6/2008 |
|---|---|---|---|
| JP | 2008143993 A | | 6/2008 |
| JP | 4649952 B | | 3/2011 |
| JP | 2012102217 A | | 5/2012 |
| JP | 2015168730 A | | 9/2015 |
| WO | WO2015068289 A1 | | 5/2015 |

OTHER PUBLICATIONS

Okuno et al, JP 2005-014755 Machine Translation, Jan. 20, 2005 (Year: 2005).*
Mai et al, JP 2007-045104 Machine Translation, Feb. 22, 2007 (Year: 2007).*
Sato, JP 2007-056185 Machine Translation, Mar. 8, 2007 (Year: 2007).*
European Patent Office, Extended European Search Report Issued in Application No. 18884889.9, dated Oct. 4, 2021, 49 pages.

* cited by examiner

ACTIVE-ENERGY-RAY CURABLE OFFSET PRINTING INK COMPOSITION, AND METHOD FOR MANUFACTURING PRINTED MATTER AND METHOD FOR ENHANCING GLOSS OF PRINTED MATTER USING THE SAME

TECHNICAL FIELD

The present invention relates to an active energy ray-curable ink composition for offset printing, a method for manufacturing printed matter with the ink composition, and a method for enhancing gloss of the printed matter.

BACKGROUND ART

Offset printing is a printing process that utilizes the water repellency of an oil-based ink composition for offset printing (hereinafter, abbreviated as "ink composition" or "ink"). The offset printing process is characterized in that an even printing plate composed of lipophilic image portions and hydrophilic non-image portions is used, unlike a relief printing process with an uneven printing plate. In the case that the even printing plate is used to perform printing, a dampening solution is brought into contact with the printing plate to form a water film on the surfaces of the non-image portions, and the ink composition is then supplied onto the printing plate. Upon supply of the ink composition, the ink composition is repelled and does not adhere to the non-image portions where the water films are formed, and adheres only to the lipophilic image portions. In this process flow, an image is formed on the surface of the printing plate with the ink composition, and the image is then transferred to, in sequence, a blanket and a paper sheet.

In addition to the offset printing using the dampening solution as described above, a waterless offset printing process has also been put into practical use with a printing plate having non-image portions composed of silicone resin. In this printing process, non-image portions are formed not by repellency of the ink composition to the dampening solution, but by repellency of the ink composition to the silicone resin. Apart from these differences, the waterless offset printing is also a printing process common to the offset printing with the dampening solution. Accordingly, the term "offset printing" may be used in this specification as a concept common to a printing process with a dampening solution and a waterless printing process.

If the ink composition adhering to the surface of the printed sheets produced by the offset printing is insufficiently dried, set-off occurs when the printed sheets are stacked, or the ink composition adheres to a person's fingers when the printed sheets are touched, and thereby the printed sheets cannot be transferred to a subsequent step or commercially distributed as products. Accordingly, a step of drying the ink composition adhering to the surface of the printed sheets is required after the offset printing. In order to perform such a process within a short time, a printing process with an active energy ray-curable ink composition has been extensively used in recent years. Such types of ink compositions contain polymerizable compounds, such as monomers or oligomers, and polymerization initiators that can polymerize the polymerizable compounds by irradiation with active energy rays, such as ultraviolet rays or electron beams. In the case that the surface of undried printed matter printed with the ink composition is irradiated with active energy rays, the polymerizable compounds contained in the ink composition are polymerized into high molecular weights. As a result, the ink composition present on the surface of the printed matter can instantaneously turn into a tack-free (i.e., dry) film. Several ink compositions undergoing such a drying step have been proposed (for example, see PTLs 1 and 2). Although the active energy rays used in this step include ultraviolet rays and electron beams, ultraviolet rays have been more frequently selected due to low costs and ease of handling of machines.

CITATION LIST

Patent Literatures

PTL1: JP 2012-102217A
PTL2: JP 4649952B

BRIEF DESCRIPTION OF THE INVENTION

Problems to be Solved

As described above, the printing with the active energy ray-curable ink composition has not only an advantage in that the printed matter can be quickly dried, but also a disadvantage in that the gloss of the printed matter tends to be lost. When the printing is performed on printing media, such as paper sheets, the ink composition is transferred from a surface of a blanket to the surfaces of the printing media During this transfer process, the ink composition is separated between the surface of blanket and the surfaces of printing media, and distributed into both surfaces. Although the surfaces of the ink composition immediately after the separation has fine irregularities accompanied by the separation, the flowability of the ink composition causes the irregularities to be leveled out over a certain time. This step is called leveling, which occurs relatively quickly after the printing, and the fine irregularities on the surface of printed matter is eliminated through this leveling to give the gloss. However, the active energy ray-curable ink composition is instantaneously converted into a composition having a high molecular weight by irradiation with active energy rays after being transferred to the printing media, and causes a rapid increase in viscosity, resulting in a loss of flowability that is necessary for sufficient leveling within a short time. It is conceivable that this mechanism leads to a decrease in gloss as described above. Printed matter having low gloss has an inferior appearance to printed matter having high gloss, and the commercial value of the printed matter is reduced in the offset printing that requires aesthetics of the printed matter.

An object of the present invention, which has been accomplished in view of the above background, is to provide an active energy ray-curable ink composition for offset printing that can yield printed matter with a superior gloss.

Means to Solve Problems

The present inventors have carried out intensive studies to solve the problems as described above, and found the following fact: in an active energy ray-curable ink composition containing a compound including ethylenically unsaturated bonds and a photopolymerization initiator, a liquid material having a group of materials consisting of a compound not containing ethylenically unsaturated bonds can be added to the ink composition while adjusting the content of the liquid material depending on an SP value to improve the leveling property at the time of printing and give a superior gloss. The present invention has been completed based on such findings and provides the following ink composition.

The present invention discloses an active energy ray-curable ink composition for offset printing that contains a compound including one or more ethylenically unsaturated bonds and a photopolymerization initiator, and that satisfies at least one of Conditions (A), (B) and (C):

Condition (A): the ink composition contains 1 mass % to 80 mass % of a first group of materials exhibiting a liquid state at room temperature, the first group of materials consisting of compounds having no ethylenically unsaturated bonds and having an SP value of $9.0$ $(cal/cm^3)^{1/2}$ to less than $11.0$ $(cal/cm^3)^{1/2}$;

Condition (B): the ink composition contains 1 mass % to 20 mass % of a second group of materials exhibiting a liquid state at room temperature, the second group of materials consisting of compounds having no ethylenically unsaturated bonds and having an SP value of less than $9.0$ $(cal/cm^3)^{1/2}$; and Condition (C): a total amount of the first group of materials in Condition (A) and the second group of materials in Condition (B) is 1 mass % or more in the entire composition, with the proviso that the contents of the first and second groups of materials in Condition (A) and Condition (B) do not exceed the respective upper limits in Condition (A) and Condition (B).

The content of the first group of materials in Condition (A) is preferably 3 mass % to 30 mass % in the entire composition.

The content of the second group of materials in Condition (B) is preferably 3 mass % to 15 mass % in the entire composition The first group of materials in Condition (A) preferably includes at least one selected from the group consisting of castor oil, coconut oil, palm kernel oil, and alkyl esters of fatty acids derived from these oils, hydrogenated castor oil, polymerized castor oil, epoxidized fats and oils, epoxidized fatty acids, alkylphenols each having a C15-C18 alkyl group, cashew nut shell liquid, polymers of cashew nut shell liquid, and modified derivatives of cashew nut shell liquid.

The second group of materials in Condition (B) is preferably fatty acid triglycerides of an animal or vegetable or esters of the fatty acids.

The first group of materials in Condition (A) is preferably animal or vegetable fat or oil or modified products thereof.

The present invention also discloses a method for manufacturing printed matter, wherein the printing is performed with the active energy ray-curable ink composition for offset printing.

The present invention also discloses a method for enhancing gloss of printed matter produced by a printing process comprising the steps of printing with an active energy ray-curable ink composition for offset printing and then curing the printed ink composition by irradiation with active energy rays, wherein the active energy ray-curable ink composition satisfies at least one of Conditions (A), (B), and (C):

Condition (A): the ink composition contains 1 mass % to 80 mass % of a first group of materials exhibiting a liquid state at room temperature, the first group of materials consisting of compounds having no ethylenically unsaturated bonds and having an SP value of $9.0$ $(cal/cm^3)^{1/2}$ to less than $11.0$ $(cal/cm^3)^{1/2}$;

Condition (B): the ink composition contains 1 mass % to 20 mass % of a second group of materials exhibiting a liquid state at room temperature, the second group of materials consisting of compounds having no ethylenically unsaturated bonds and having an SP value of less than $9.0$ $(cal/cm^3)^{1/2}$, and Condition (C): a total amount of the first group of materials in Condition (A) and the second group of materials in Condition (B) is 1 mass % or more in the entire composition, with the proviso that the contents of the first and second groups of materials in Conditions (A) and (B) do not exceed the respective upper limits in Conditions (A) and (B).

Advantages of the Invention

The present invention provides an active energy ray-curable ink composition for offset printing that can give a superior gloss of printed matter.

EMBODIMENTS OF THE INVENTION

An active energy ray-curable ink composition for offset printing, a method for manufacturing printed matter, and a method for enhancing gloss of printed matter will now be described as one embodiment of the present invention. It should be noted that the present invention is not limited to the following aspects or embodiments, and can be implemented with appropriate modifications within the scope of the present invention.

<Active Energy Ray-Curable Ink Composition for Offset Printing>

The inventive active energy ray-curable ink composition for offset printing (hereinafter, also simply referred to as "ink composition") is an ink composition applicable to lithographic offset printing, and can cure upon irradiation with active energy rays, such as ultraviolet rays or electron beams. As will be described below, the inventive ink composition contains a compound having one or more ethylenically unsaturated bonds (e.g., a monomer or oligomer) and a photopolymerization initiator, where the radicals generated from the photopolymerization initiator when irradiated with active energy rays can cure the ink compound having ethylenically unsaturated bond(s) through polymerization. When the ink composition that is tacky on the surface of printed matter is irradiated with active energy rays, the ink composition is instantaneously cured into a film that is in a dry (or tack-free) state.

Active energy rays used in curing of the inventive ink composition may be of any type that generates radicals by cleaving a chemical bond in a photopolymerization initiator as described later. Examples of such active energy rays include ultraviolet rays and electron beams. Particularly preferred active energy rays are ultraviolet rays from the viewpoint of low costs and ease of machine handling. When ultraviolet rays are used as the active energy rays, the wavelength may be appropriately determined depending on the absorption wavelength of photopolymerization initiator to be employed, and may be 400 nm or less. Examples of the ultraviolet generator include metal halide lamps, high-pressure mercury lamps, excimer lamps containing rare gas, and ultraviolet light-emitting diodes (LEDs).

The inventive ink composition is characterized by containing a compound having one or more ethylenically unsaturated bonds and a photopolymerization initiator, and by satisfying at least one of Conditions (A), (B), and (C). Each group of materials illustrated in Conditions (A), (B), and (C), which is characteristic of the present invention, has no ethylenically unsaturated bonds exhibiting high polymerization activity in the presence of radicals. The inventive ink composition contains these groups of materials to improve the leveling during printing, resulting in a superior gloss of the printed matter. The inventive ink composition may further contain coloring agents, such as a material that imparts a white or metallic color to the ink composition. An ink composition containing coloring agents can be used for the purpose of printing, for example, images and characters. An ink composition containing no coloring agents can be used for the purpose of, for example, coating. The inventive ink composition is applicable not only to ordinary printed matters for delivery of information or appreciation of pictures, but also to several printing applications by offset printing, such as package printing. Each ingredient constituting the ink composition will now be described in sequence.

[Compound Having One or More Ethylenically Unsaturated Bonds]

The compound having one or more ethylenically unsaturated bonds is an ingredient called a monomer or an oligomer that is polymerized by radicals generated from a photopolymerization initiator described later into a higher molecular weight. Various polymers having ethylenically unsaturated bonds, which have a higher molecular weight than oligomers, are also commercially available. Such polymers can also be crosslinked with themselves or with the monomer or oligomer into a higher molecular weight. Such polymers may thus be used as compounds having ethylenically unsaturated bonds together with the monomer or oligomer.

The monomer having ethylenically unsaturated bonds can be polymerized into a higher molecular weight, as described above. In many cases, the monomer is a liquid ingredient having a relatively low molecular weight before polymerization and is used as a solvent for dissolving a resin component into varnish and for adjusting the viscosity of the ink composition. Examples of the monomer include monofunctional monomers having one ethylenically unsaturated bond in the molecule and di- or higher functional monomers having two or more ethylenically unsaturated bonds in the molecule. The di- or higher functional monomer can mutually crosslink during curing of the ink composition, thereby contributing to an increase in curing rate and formation of a rigid film. The monofunctional monomer has no crosslinking ability as described above, thereby contributing to a reduction in curing contraction due to crosslinking. These monomers can be used in combination of several types as needed.

Examples of the monofunctional monomers include alkyl acrylates, such as methyl (meth)acrylate, ethyl (meth)acrylate, butyl (meth)acrylate, hexyl (meth)acrylate, octyl (meth)acrylate, dodecyl (meth)acrylate; and (meth)acrylic acid, ethylene oxide adducts of (meth)acrylate, propylene oxide adducts of (meth)acrylate, isobornyl (meth)acrylate, cyclohexyl (meth)acrylate, tricyclodecane monomethylol (meth)acrylate, 2-hydroxyethyl (meth)acrylate, 2-hydroxypropyl (meth)acrylate, 3-hydroxypropyl (meth)acrylate, 2-hydroxybutyl (meth)acrylate, 4-hydroxybutyl (meth)acrylate, hydroxypentyl (meth)acrylate, 2-hydroxy-3-phenoxypropyl (meth)acrylate, 2-hydroxy-3-butoxypropyl (meth)acrylate, 2-hydroxy-3-methoxypropyl (meth)acrylate, di(ethylene glycol) mono(meth)acrylate, tri(ethylene glycol) mono(meth)acrylate, poly(ethylene glycol) mono(meth)acrylate, di(propylene glycol) mono(meth)acrylate, poly(propylene glycol) mono(meth)acrylate, glycerol mono(meth)acrylate, acryoloxyethyl phthalate, 2-(meth)acryloyloxyethyl-2-hydroxyethyl phthalate, 2-(meth)acryloyloxypropyl phthalate, β-carboxyethyl (meth)acrylate, (meth)acrylic acid dimer, ω-carboxypolycaprolactone mono(meth)acrylate, dimethylaminoethyl (meth)acrylate, diethylaminoethyl (meth)acrylate, N-vinylpyrrolidone, N-vinylformamide, and (meth)acryloylmorpholine. These monofunctional monomers may be used alone or in combination. Throughout the specification, the term "(meth)acrylate" indicates "acrylate and/or methacrylate", and the term "(meth)acrylic acid" indicates "acrylic acid and/or methacrylic acid".

Examples of the di- or higher functional monomers include difunctional monomers, such as ethylene glycol di(meth)acrylate, di(ethylene glycol)di(meth)acrylate, tri(ethylene glycol) di(meth)acrylate, poly(ethylene glycol) di(meth)acrylate, propylene glycol di(meth)acrylate, di(propylene glycol) di(meth)acrylate, tri(propylene glycol) di(meth)acrylate, poly(propylene glycol) di(meth)acrylate, butylene glycol di(meth)acrylate, pentyl glycol di(meth)acrylate, neopentyl glycol di(meth)acrylate, hydroxypivalyl hydroxypivalate di(meth)acrylate, hydroxypivalyl hydroxypivalate dicaprolactonate di(meth)acrylate, 1,6-hexanediol di(meth)acrylate, 1,2-hexanediol di(meth)acrylate, 1,5-hexanediol di(meth)acrylate, 2,5-hexanediol di(meth)acrylate, 1,7-heptanediol di(meth)acrylate, 1,8-octanediol di(meth)acrylate, 1,2-octanediol di(meth)acrylate, 1,9-nonanediol di(meth)acrylate, 1,2-decanediol di(meth)acrylate, 1,10-decanediol di(meth)acrylate, 1,2-decanediol di(meth)acrylate, 1,12-dodecanediol di(meth)acrylate, 1,2-dodecanediol di(meth)acrylate, 1,14-tetradecanediol di(meth)acrylate, 1,2-tetradecanediol di(meth)acrylate, 1,16-hexadecanediol di(meth)acrylate, 1,2-hexadecanediol di(meth)acrylate, 2-methyl-2,4-pentanediol di(meth)acrylate, 3-methyl-1,5-pentanediol di(meth)acrylate, 2-methyl-2-propyl-1,3-propanediol di(meth)acrylate, 2,4-dimethyl-2,4-pentanediol di(meth)acrylate, 2,2-diethyl-1,3-propanediol di(meth)acrylate, 2,2,4-trimethyl-1,3-pentanediol di(meth)acrylate, dimethyloloctane di(meth)acrylate, 2-ethyl-1,3-hexanediol di(meth)acrylate, 2,5-dimethyl-2,5-hexanediol di(meth)acrylate, 2-methyl-1,8-octanediol di(meth)acrylate, 2-butyl-2-ethyl-1,3-propanediol di(meth)acrylate, 2,4-diethyl-1,5-pentanediol di(meth)acrylate, 1,2-hexanediol di(meth)acrylate, 1,5-hexanediol di(meth)acrylate, 2,5-hexanediol di(meth)acrylate, 1,7-heptanediol di(meth)acrylate, 1,8-octanediol di(meth)acrylate, 1,2-octanediol di(meth)acrylate, 1,9-nonanediol di(meth)acrylate, 1,2-decanediol di(meth)acrylate, 1,10-decanediol di(meth)acrylate, 1,2-decanediol di(meth)acrylate, 1,12-dodecanediol di(meth)acrylate, 1,2-dodecanediol di(meth)acrylate, 1,14-tetradecanediol di(meth)acrylate, 1,2-tetradecanediol di(meth)acrylate, 1,16-hexadecanediol di(meth)acrylate, 1,2-hexadecanediol di(meth)acrylate, 2-methyl-2,4-pentane di(meth)acrylate, 3-methyl-1,5-pentanediol di(meth)acrylate, 2-methyl-2-propyl-1,3-propanediol di(meth)acrylate, 2,4-dimethyl-2,4-pentanediol di(meth)acrylate, 2,2-diethyl-1,3-propanediol di(meth)acrylate, 2,2,4-trimethyl-1,3-pentanediol di(meth)acrylate, dimethyloloctane di(meth)acrylate, 2-ethyl-1,3-hexanediol di(meth)acrylate, 2,5-dimethyl-2,5-hexanediol di(meth)acrylate, 2-butyl-2-ethyl-1,3-propanediol di(meth)acrylate, 2,4-diethyl-1,5-pentanediol di(meth)acrylate, tricyclodecane dimethylol di(meth)acrylate, tricyclodecane dimethylol dicaplolactonate di(meth)acrylate, bisphenol A tetra(ethylene oxide) adduct di(meth)acrylate, bisphenol F tetra(ethylene oxide) adduct di(meth)acrylate, bisphenol S tetra(ethylene oxide) adduct di(meth)acrylate, hydrogenated bisphenol A tetra(ethylene oxide) adduct di(meth)acrylate, hydrogenated bisphenol F tetra(ethylene oxide) adduct di(meth)acrylate, hydrogenated bisphenol A di(meth)acrylate, hydrogenated bisphenol F di(meth)acrylate, bisphenol A tetra(ethylene oxide) adduct dicaplolactonate di(meth)acrylate, and bisphenol F tetra(ethylene oxide) adduct dicaplolactonate di(meth)acrylate; and trifunctional monomers, such as glycerol tri(meth)acrylate, trimethylolpropane tri (meth)acrylate, trimethylolpropane tricaplolactonate tri (meth)acrylate, trimethylolethane tri(meth)acrylate, trimethylolhexane tri(meth)acrylate, trimethyloloctane tri(meth) acrylate, and pentaerythritol tri(meth)acrylate; and tetra- or higher functional monomers, such as trimethylolpropane tetra(meth)acrylate, pentaerythritol tetra(meth)acrylate, pentaerythritol tetracaplolactonate tetra(meth)acrylate, diglycerol tetra(meth)acrylate, ditrimethylolpropane tetra(meth) acrylate, ditrimethylolpropane tetracaplolactonate tetra (meth)acrylate, ditrimethylol ethane tetra(meth)acrylate, ditrimethylolbutan tetra(meth)acrylate, ditrimethylolhexane tetra(meth)acrylate, ditrimethyloloctane tetra(meth)acrylate, dipentaerythritol penta(meth)acrylate, dipentaerythritol hexa(meth)acrylate, tridipentaerythritol hexa(meth)acrylate, tripentaerythritol hepta(meth)acrylate, tripentaerythritol octa(meth)acrylate, and tripentaerythritol poly(alkylene oxide) hepta(meth)acrylate. These di- or higher functional monomers may be used alone or in combination.

Another type of monomer is acrylate of epoxidized vegetable oil prepared through acrylic modification of epoxidized vegetable oil. This acrylate is a compound produced by ring-opening addition polymerization of (meth)acrylic acid to epoxy groups in the epoxidized vegetable oil prepared through epoxidization of double bonds in unsaturated vegetable oil with an oxidizing agent, for example, peracetic acid or perbenzoic acid. The unsaturated vegetable oil indicates triglyceride of at least one fatty acid having at least one carbon-carbon unsaturated bond. Examples of the vegetable oil include hemp seed oil, linseed oil, perilla oil, oiticica oil, olive oil, cocoa oil, kapok oil, kaya oil, mustard oil, apricot oil, tung oil, kukui oil, walnut oil, poppy oil, sesame oil, safflower oil, radish seed oil, soybean oil, hydnocarpus oil, camellia oil, corn oil, rapeseed oil, niger oil, rice-bran oil, palm oil, castor oil, sunflower oil, grape seed oil, almond oil, pine seed oil, cottonseed oil, coconut oil, peanut oil, and dehydrated castor oil. Since this type of monomer is derived from the vegetable oil, this serves to increase the amount of biomass ingredients in the ink composition. Several types of epoxidized vegetable oil acrylates are commercially available and may be used.

The oligomer is a polymerized ingredient that has a high molecular weight, as described above. The oligomer inherently has a relatively high molecular weight, and thereby can be used for imparting appropriate viscosity and elasticity to the ink composition. Examples of the oligomers include epoxy-modified (meth)acrylates, such as esters formed by a reaction of (meth)acrylic acid with hydroxyl groups generated after opening of the epoxy rings contained in epoxy compounds, such as epoxy resins, using acids or bases; rosin-modified epoxidized acrylates; polyester-modified (meth)acrylates, such as esters formed by a reaction of (meth)acrylic acid with terminal hydroxyl groups of condensates of dibasic acids and diols; polyether-modified (meth)acrylates, such as esters formed by a reaction of (meth)acrylic acid with terminal hydroxyl groups of polyethers; and urethane-modified (meth)acrylates, such as esters formed by a reaction of (meth)acrylic acid with terminal hydroxyl groups of condensates of polyisocyanates and polyols. Such oligomers are commercially available under trade names, for example, Evecryl series available from Daicel Cytech Co., Ltd.; CN and SR series available from Sartomer Co., Ltd.; Aronix M-6000 series, 7000 series, 8000 series, Aronix M-1100, Aronix M-1200, and Aronix M-1600 available from Toagosei Co., Ltd.; and NK Oligo available from Shin-Nakamura Chemical Co., Ltd. These oligomers can be used alone or in combination.

The polymer including ethylenically unsaturated bonds is an ingredient that increases the molecular weight along with the monomers and oligomers, and has a high molecular weight even before irradiation with active energy rays, thereby enhancing the viscoelasticity of the ink composition. Such a polymer is used, for example, in a state of being dissolved or dispersed in a monomer that is a low-viscosity liquid. Examples of the polymers having ethylenically unsaturated bonds include poly(diallyl phthalate), acrylic resins including unreacted and unsaturated groups, and acryl-modified phenol resins. Among these polymers, poly (diallyl phthalate) can be preferably used because of particularly superior compatibility with the monomers and oligomers.

The content of the compound having one or more ethylenically unsaturated bonds in the ink composition is preferably 30 to 70 mass %, and more preferably 40 to 60 mass %. Such a range of content of the compound having one or more ethylenically unsaturated bonds results in both high curability and superior printability. The content of the polymer having one or more ethylenically unsaturated bonds is preferably 0 to 50 mass %, more preferably 0 to 30 mass %, and even more preferably 0 to 20 mass %. Such a range in content of the polymer preferably results in high curability of the ink composition as well as a reduction in misting through imparting appropriate viscoelasticity to the ink composition.

[Photopolymerization Initiator]

The photopolymerization initiator is an ingredient that generates radicals by irradiation with active energy rays, and the resultant radicals polymerize the compound having one or more ethylenically unsaturated bonds, thereby curing the ink composition. The photopolymerization initiator may be any material that generates radicals by irradiation with active energy rays.

Examples of the photopolymerization initiator include benzophenone, diethylthioxanthone, 2-methyl-1-(4-methylthio)phenyl-2-morpholinopropan-1-one, 4-benzoyl-4'-methyldiphenylsulfide, 1-chloro-4-propoxythioxanthone, isopropylthioxanthone, 2-hydroxy-2-methyl-1-phenylpropane-1-one, 1-hydroxycyclohexylphenyl ketone, bis-2,6-dimethoxybenzoyl-2,4,4-trimethylpentylphosphine oxide, 1-[4-(2-hydroxyethoxy)-phenyl]-2-hydroxy-2-methyl-1-propane-1-one, 2,2-dimethyl-2-hydroxyacetophenone, 2,2-dimethoxy-2-phenylacetophenone, 2,4,6-trimethylbenzyl-diphenylphosphine oxide, and 2-benzyl-2-dimethylamino-1-(morpholinophenyl)-butan-1-one. Such photopolymerization initiators are commercially available under trade names, for example, Irgacure 907, Irgacure 369, Irgacure 184, Irgacure 379, Irgacure 819, and TPO available from BASF; and DETX available from Lamberti S.p.A. These photopolymerization initiators can be used alone or in combination.

The content of the photopolymerization initiator in the ink composition is preferably 1 to 20 mass %, more preferably 2 to 15 mass %, and even more preferably 2 to 13 mass %. Such a range of content of the photopolymerization initiator in the ink composition preferably results in sufficient curability of the ink composition, superior internal curability, and material costs. In addition, the inventive ink composition includes epoxidized fat or oil (described later) to enhance the curability by irradiation with ultraviolet rays, thereby the content of the photopolymerization initiator can be reduced compared with a conventional composition. Accordingly, it is preferred that the amount of the photopolymerization initiator be appropriately reduced depending on practical printing conditions.

The inventive ink composition is characterized by satisfying at least one of Conditions (A), (B), and (C) described below. The phrase "satisfying at least one of Conditions (A), (B), and (C)" indicates that one, two, or all three of Conditions (A), (B), and (C) are satisfied.

Conditions (A), (B), and (C) are all common in that the inventive ink composition includes first and second groups of materials that are in a liquid state at room temperature and composed of a compound having no ethylenically unsaturated bonds. Prior to the detailed description about these conditions, the reason why the gloss after printing is enhanced by containing these ingredients in the inventive ink composition will now be discussed.

In an ink composition having a relatively slow drying rate after printing, for example, in an oxidative polymerizable composition, an ingredient such as a drying oil contained in the composition plays a role of curing the composition by an increase in molecular weight through oxidative polymerization, and also serves as a solvent that gives high flowability to the ink composition. Since an increase in molecular weight proceeds relatively moderately after printing, the printed ink composition cures by an increase in molecular weight while exhibiting a superior gloss through sufficient leveling due to high flowability. In an active energy ray-curable ink composition, a liquid ingredient such as monomers plays a role of curing by an increase in molecular weight and conferring flowability, and the ingredient is rapidly polymerized and sharply thickened once radicals are generated in the composition by irradiation with active energy rays. Accordingly, the ink composition after printing loses its flowability before sufficient leveling, resulting in printed matter having insufficient leveling and an inferior gloss.

In contrast, the inventive ink composition includes the first and second groups of materials that are in a liquid state at room temperature and composed of a compound having no ethylenically unsaturated bonds. Since these groups of materials do not rapidly polymerize in the presence of radicals, it is conceivable that the groups of materials can maintain the flowability of the ink composition and contribute to enhanced leveling while an ingredient such as monomers is polymerized in the presence of radicals in the ink composition after printing. This mechanism is presumed to cause generation of a superior gloss on the printed sheet with the inventive ink composition. The present inventors have discovered the following fact: although the groups of materials are ingredients that have no ethylenically unsaturated bonds and barely contributes to the curing of the ink composition by irradiation with active energy rays, practical curing can be achieved as a whole of the ink composition without problems during printing even if such an ingredient is contained in the ink composition. The "group of materials" may be composed of one or more compounds. Each condition illustrated above will be described below.

[Condition (A)]

In Condition (A), the ink composition contains 1 mass % to 80 mass % of the first group of materials exhibiting a liquid state at room temperature, the first group of materials consisting of compounds having no ethylenically unsaturated bonds and having an SP value of 9.0 $(\text{cal}/\text{cm}^3)^{1/2}$ to less than 11.0 $(\text{cal}/\text{cm}^3)^{1/2}$. In general, each polymerizable ingredient, such as monomers, used in the active energy ray-curable ink composition has a higher polarity than an ingredient, such as fat or oil, used in the ink composition for any other drying process. Accordingly, an ingredient having an SP value of less than 9.0 $(\text{cal}/\text{cm}^3)^{1/2}$ has poor compatibility with the ingredients, such as monomers, used in the active energy ray-curable ink composition, resulting in a limited amount of addition. In contrast, an ingredient having an SP value of 9.0 $(\text{cal}/\text{cm}^3)^{1/2}$ to less than 11.0 $(\text{cal}/\text{cm}^3)^{1/2}$ has high compatibility with the ingredients, such as monomers, resulting in a limitless amount of addition in view of solubility. The first group of materials defined in Condition (A) is categorized into a group having high compatibility with the ingredients, such as monomers. Although the first group of materials has no upper limit of amount added to the ink composition, the upper limit should be set to 80 mass % to achieve superior properties, such as curability, in the present invention. The upper limit is preferably 50 mass %, more preferably 30 mass %. In order to achieve high leveling of the ink composition after printing, the lower limit of the content of first group of material defined in Condition (A) is 1 mass %, preferably 3 mass % in the ink composition.

The "liquid state at room temperature" indicates a liquid state at a temperature in a storage environment or a printing environment of the ink composition. Such a room temperature includes approximately 0 to 50° C. This definition is applied to Conditions (B) and (C) described later.

The SP value means solubility parameter. The value can be measured by a turbidimetric titration, which is a simple and practical measurement, and calculated in accordance with the expression of K. W. Suh and J. M. Corbett as shown below. The calculation of the SP value in the measurement can be referred to in J. Appl. Polym. Sci. 1968, 12, 2359. This measurement is also applied to the SP value in Condition (B).

$$\text{SP value} = (V_{ml}^{1/2} \cdot \delta H + V_{mh}^{1/2} \cdot \delta D)/(V_{ml}^{1/2} + V_{mh}^{1/2}) \quad \text{Expression:}$$

In the turbidimetric titration, 0.5 g of a sample is dissolved in 10 mL of toluene or 10 mL of trimethylolpropane triacrylate (TMPTA) that is a good solvent, and n-hexane that is a poor solvent having a low SP value is then gradually added to the resultant solution and the volume of titration H (mL) is recorded at a turbid point. Similarly, ethanol that is a poor solvent having a high SP value is gradually added to the toluene solution and the volume of titration D (mL) is recorded at a turbid point. The values H and D are substituted into the following expressions to calculate $V_{ml}$, $V_{mh}$, δH and δD, and these values can be substituted into the expression described above to calculate the SP value.

The molecular volume and SP value of each solvent used in the turbidimetric titration are as follows:

(Molecular volume of good solvent) φ0, toluene: 106.28 mL/mol

TMPTA: 279.55 mL/mol (Molecular volume of poor solvent having low SP value) φ1, n-hexane: 131.61 mL/mol (Molecular volume of poor solvent having high SP value) φh, ethanol: 58.39 mL/mol (SP value of each solvent), toluene: 9.14, TMPTA: 9.88, n-hexane: 7.28, ethanol: 12.58

$$V_{ml} = (\varphi 0 \cdot \varphi 1)/\{(1-VH) \cdot \varphi 1 + VH \cdot \varphi 0\}$$

$$V_{mh} = (\varphi 0 \cdot \varphi h)/\{(1-VD) \cdot \varphi h + VD \cdot \varphi 0\}$$

$$VH = H/(M+H)$$

$$VD = D/(M+D)$$

$$\delta H = (\delta 0 \cdot M)/(M+H) + (\delta l \cdot H)/(M+H)$$

$$\delta D = (\delta 0 \cdot M)/(M+D) + (\delta l \cdot D)/(M+D)$$

δ0: SP value of good solvent

δl: SP value of poor solvent having low SP value

δh: SP value of poor solvent having high SP value

H: volume of titration of poor solvent having low SP value (mL)

D: volume of titration of poor solvent having high SP value (mL)

M: volume of good solvent (mL)

VH: volume fraction of titration of poor solvent having low SP value (%)

VD: volume fraction of titration of poor solvent having high SP value (%)

The compound categorized into the first group of material in Condition (A) preferably contains no ethylenically unsaturated bonds and has an SP value within the above range. The compound preferably exhibits a liquid state at room temperature when used as the first group of materials. One example of the first group of materials containing such a compound includes at least one selected from the group consisting of animal or vegetable fat or oil or modified products thereof, and alkylphenols having C15-C18 alkyl that have an SP value within the above range. The animal or vegetable fat or oil or modified products thereof having an SP value within the above range are particularly preferred in the first group of material. The term "animal or vegetable fat or oil" in the present invention usually indicates triglyceride, such as animal oils or vegetable oils, but it also includes oily substances derived from animals and vegetables in a broad sense. Examples of such animal or vegetable fat or oil include castor oil, coconut oil, palm kernel oil, and cashew nut shell liquid. Examples of the modified products of animal or vegetable fat or oil include those, having an SP value within the above range, prepared through chemical modification of animal or vegetable fats or oils regardless of the original SP value of the fats or oils before modification. Examples of such modified products include fatty acid alkylesters of triglyceride having a high SP value, such as castor oil, coconut oil and palm kernel oil, hardened castor oil, polymerized castor oil, epoxidized fat or oil, epoxidized fatty acid, polymers of cashew nut shell liquid, and modified derivatives of cashew nut shell liquid. The term "compound having no ethylenically unsaturated bonds" indicates a compound not having a substituent, for example, an acryloyl, methacryloyl, or vinyl groups, which rapidly polymerizes in the presence of radicals.

Epoxidized fat or oil is ester of fatty acid having at least one epoxy group and alcohol. The ester of fatty acid and alcohol referred to in the specification are not limited to triglyceride, which is ester of fatty acid and glycerol, and also include esters of fatty acids and monofunctional or polyfunctional alcohols (in other words, monools or polyols) in a broad sense. Examples of such alcohols include, but should not be limited to, C1-C14 alcohols, such as glycerol, methanol, ethanol, propanol, 2-propanol, and 2-ethylhexanol. Polyhydric alcohols, such as glycerol, may be condensed with at least one fatty acid having at least one epoxy group (i.e., an ester bond is formed), or with two or more fatty acids having at least one epoxy group. These fatty acids may be independently selected. Since the epoxidized fats and oils exhibit a high SP value due to the existence of intramolecular epoxy groups, raw materials, such as various oils and fatty acid esters thereof derived from animal or vegetable inherently having a low SP value, may be epoxidized. An epoxidized fatty acid indicates a fatty acid having at least one epoxy group.

The epoxy group is three-membered cyclic ether (also called oxirane or alkylene oxide) where an oxygen atom bonds to two vicinal carbon atoms. Examples of the epoxidized fats and oils include epoxidized soybean oil (ESO), epoxidized corn oil, epoxidized sunflower oil, epoxidized linseed oil, epoxidized canola oil, epoxidized rapeseed oil, epoxidized safflower oil, epoxidized tall oil, epoxidized tung oil, epoxidized fish oil, epoxidized beef tallow oil, epoxidized castor oil, epoxidized methyl stearate, epoxidized butyl stearate, epoxidized 2-ethylhexyl stearate, epoxidized stearyl stearate, 3,4-epoxycyclohexylmethyl-3,4-epoxycyclohexanecarboxylate, epoxidized soybean oil, epoxidized propylene glycol dioleate, epoxidized palm oil, and epoxidized fatty acid methyl ester, preferably epoxidized vegetable oil, more preferably epoxidized soybean oil.

Epoxidized fats and oils can be prepared by a variety of processes. For example, an epoxidized fat or oil having a triglyceride skeleton can be prepared by oxidization of vegetable oil or animal oil having unsaturated bonds in fatty acid moieties with suitable oxidizing agents such as peroxides. Epoxidized fats and oils having fatty acid esters other than triglyceride skeletons can be prepared by oxidization of the fatty acid esters with suitable oxidizing agents such as peroxides, the fatty acid esters being produced by esterification of fatty acids having unsaturated bonds with alcohols (e.g., monools or polyols), or transesterification or ester exchange reaction of animal oil or vegetable oil having unsaturated bonds and alcohols. It should be noted that these preparation processes are merely exemplary, and other processes may be employed, or commercially available epoxidized fats or oils may be used.

Cashew nut shell liquid is an oily liquid, which is contained in cashew nut shells, yielded as a by-product when natural cashew nuts are processed for food, and contains, for example, anacardic acid, cardol, 2-methylcardol, and cardanol. In such materials, cardanol and cardol are compounds where hydroxyl groups and linear hydrocarbons bond to aromatic rings, 2-methylcardanol is a compound where a methyl group bonds to the aromatic ring of cardanol, and cardanolic acid is a compound where the carboxyl group bonds to the aromatic ring of cardanol. All these compounds are also called alkenyl group-substituted phenols. The alkenyl group contained in the compounds is a C15-C18 aliphatic hydrocarbon group and has 1 to 3 unsaturated bonds in its chain. The unsaturated bonds contained in the alkenyl group are included in the middle of the linear hydrocarbon group, and are different from the ethylenically unsaturated bonds. Various commercially available products of cashew nut shell liquids may be used in the present invention. Several types of products are available depending on, for example, the purity, color, and odor of cardanol. Such types include Cardolite™ NX-2021, NX-2022, NX-2023D, NX-2023, UltraLITE2023, NX-2024, NX-2025 and NX-2026 available from Cardolite Corporation, and CNSL, LB-7000 and LB-7250 available from Tohoku Chemical industries, Ltd.

Examples of the modified derivatives of cashew nut shell liquid include derivatives where various groups are introduced into phenolic hydroxyl groups of alkenyl-substituted phenols contained in cashew nut shell liquid, derivatives where various substituents are introduced into unsaturated bonds of alkenyl groups, and derivatives epoxidized by oxidation of unsaturated bonds in alkenyl groups. Various commercially available modified derivatives may be used in the present invention.

Several compounds represented by any of formulae (1) to (4) below are preferred among such modified derivatives.

[Chemical formulae 1]

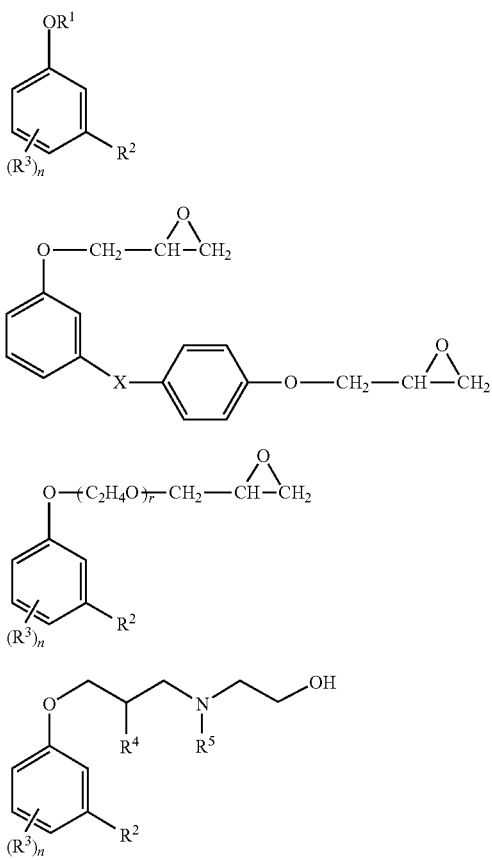

In general formula (1), $R^1$ is hydrogen, glycidyl, —$(CH_2)_m$OH (m is an integer of 1 to 3), —$(C_2H_4O)_p$H (p is an integer of 1 to 15), or —$(CH_2CH(CH_3)O)_q$—H (q is an integer of 1 to 15); $R^2$ is C15-C18 aliphatic hydrocarbon containing 0 to 3 unsaturated bonds, part or all of which may be oxidized to form one or more epoxy rings; and $R^3$s are independently $OR^1$, C1-C3 alkyl, or C1-C3 carboxyl; and n is an integer of 0 to 4.

Examples of the commercially available products of the compound represented by general formula (1) include Cardolite™ LITE 2020 and Cardolite™ NC-513, NC-510, GX-5166, GX-5167, GX-5170, GX-5248, GX-5190, GX-5191, GX-2551 available from Cardolite Corporation. Among these products, LITE2020 is an alkenyl-substituted phenyl ether compound where $R^1$ is —$CH_2CH_2OH$, $R^2$ is C15 alkenyl and n is 0; NC-513 is an alkenyl-substituted phenylglycidyl ether compound where $R^1$ is glycidyl and $R^2$ is C15 alkenyl and n is 0; NC-510 is an alkenyl-substituted phenol compound where $R^1$ is hydrogen, $R^2$ is C15 alkenyl and n is 0; GX-5166, 5167 and 5170 are alkenyl-substituted phenylethyloxylate compounds where $R^1$ is —$(C_2H_4O)_p$—H, $R^2$ is C15 alkenyl, n is 0, p is 7 for GX-5166, p is 9 for GX-5167, and p is 12 for GX-5170; and GX-5243, 5190 and 5191 are alkenyl-substituted phenylpropyloxylate compounds where $R^1$ is —$(CH_2CH(CH_3)O)_q$—H, $R^2$ is C15 alkenyl, n is 0, q is 1 for GX-5243, q is 7 for GX-5190, and q is 9 for GX-5191. GX-2551 is a mixture of compounds represented by chemical formulae (5-1), (5-2), and (5-3) or epoxidized cardanol where $R^1$ is glycidyl, $R^2$ is an epoxy ring formed by oxidation of at least one unsaturated bonds included in a C15 alkenyl group, and n is 0.

[Chemical formulae 2]

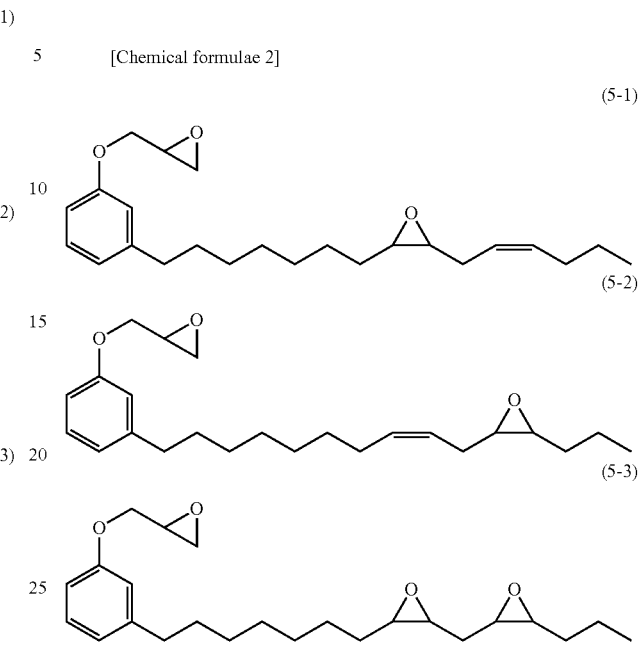

In general formula (2), X is C15-C18 linear or branched aliphatic hydrocarbon having 0 to 3 unsaturated bonds. A commercially available product of the compound represented by general formula (2) is Cardolite™ NC-514 available from Cardolite Corporation.

In general formula (3), $R^2$, $R^3$ and n are as defined in general formula (1), and r is an integer of 1 to 5. A commercially available product of the compound represented by general formula (3) is Cardolite™ GX-2520 available from Cardolite Corporation.

In general formula (4), $R^2$, $R^3$ and n are as defined in general formula (1), $R^4$ is hydrogen or hydroxyl, and $R^5$ is hydrogen or —$C_2H_4OH$. Examples of the commercially available products of the compound represented by general formula (4) include Cardolite™ GX-9301 and GX-9302 available from Cardolite Corporation.

Examples of the polymer of cashew nut shell liquid preferably include a condensate of cashew nut shell liquid and/or a modified derivative thereof with formaldehyde. One example of such a condensate is represented by general formula (6):

[Chemical formula 3]

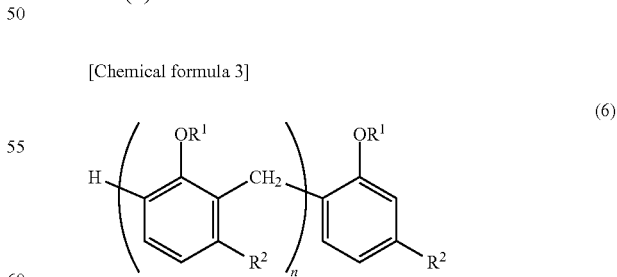

In general formula (6), $R^1$s are each independently hydrogen, —$(CH_2)_m$OH, or glycidyl; m is an integer of 1 to 3; $R^2$s are each independently C15-C18 aliphatic hydrocarbon having 0 to 3 unsaturated bonds; and n is an integer of 1 or more.

Examples of the commercially available product represented by general formula (6) include Cardolite™ NC-547 and NX-4000 series available from Cardolite Corporation. The NC-547 is a condensate of cardanol and a cardanol-modified derivative with formaldehyde having a structure represented by general formula (7-1). The NX-4000 series resins are condensates of cardanol with formaldehyde having a structure represented by general formula (7-2).

[Chemical formulae 4]

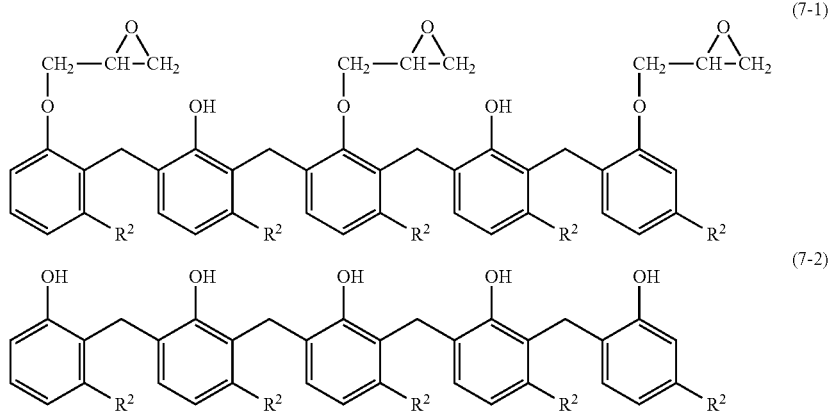

In general formulae (7-1) and (7-2), $R^2$s are each independently C15-C18 aliphatic hydrocarbon having 0 to 3 unsaturated bonds.

[Condition (B)]

In Condition (B), the ink composition contains 1 mass % to 20 mass % of the second group of materials exhibiting a liquid state at room temperature, the group of materials consisting of compounds having no ethylenically unsaturated bonds and having an SP value of less than 9.0 $(cal/cm^3)^{1/2}$. The second group of materials included in Condition (B) have a lower SP value than the first group of materials in Condition (A), and have inferior compatibility with polymerizable ingredients, such as monomers, used in the active energy ray-curable ink composition to the first group of materials in Condition (A). In contrast, the second group of materials in Condition (B) in an amount of up to 20 mass % can be mixed with the ink composition without issues, such as separation of the ink ingredients. Such a range of content can also enhance the leveling, like the first group of materials in Condition (A). In other words, the second group of materials in Condition (B) can be used as the first group of materials in Condition (A) as long as the content of the second group of materials in the ink composition satisfies 20 mass % or less. An ink composition containing, for example, 10 mass % of the second group of materials in Condition (B) is comparable to an ink composition containing 10 mass % of the first group of materials in Condition (A) as far as the enhancement in leveling. The SP value of the compound included in the second group of materials in Condition (B) has a lower limit of preferably 7.5 $(cal/cm^3)^{1/2}$, more preferably 8.0 $(cal/cm^3)^{1/2}$.

As described above, the upper limit of the content of second group of materials defined in Condition (B) is 20 mass % in the ink composition to maintain the compatibility with the ingredient, such as monomers. The upper limit is preferably 15 mass %. In order to achieve a high leveling of the ink composition after printing, the lower limit of the content of second group of materials defined in Condition (B) is 1 mass %, preferably 3 mass % in the ink composition.

The compound contained in the second group of materials in Condition (B) preferably contains no ethylenically unsaturated bonds and has an SP value within the above range. The compound preferably exhibits a liquid state at room temperature when used as the second group of material. Examples of the second group of material containing such a compound include animal and vegetable oils themselves, i.e. triglycerides of fatty acids, or alkyl esters of fatty acids derived from the animal and vegetable oils; more specifically, hemp seed oil, tall oil, linseed oil, perilla oil, oiticica oil, olive oil, cocoa oil, kapok oil, kaya oil, mustard oil, apricot oil, tung oil, kukui oil, walnut oil, poppy oil, sesame oil, safflower oil, radish seed oil, soybean oil, hydnocarpus oil, camellia oil, corn oil, rapeseed oil, niger oil, rice-bran oil, palm oil, sunflower oil, grape seed oil, almond oil, pine seed oil, cottonseed oil, peanut oil, dehydrated castor oil, refined avocado oil, kukui nut oil, sweet almond oil, corn germ oil, pistachio nut oil, hazelnut oil, macadamia nut oil, meadow foam oil, rose hip oil, alkyl esters of fatty acids derived from these oils, and thermally polymerized oils and oxygen blown polymerized oils. These oils may be used alone or in combination.

[Condition (C)]

In Condition (C), the total amount of the first group of materials in Condition (A) and the second group of materials in Condition (B) is 1 mass % or more in the entire composition, with the proviso that the contents of the first and second groups of materials in Conditions (A) and (B) do not exceed the respective upper limits in Conditions (A) and (B). As already described, the second group of materials defined in Condition (B) can be used as the first group of materials defined in Condition (A), provided that each group of materials do not exceed the respective upper limits described above. Accordingly, Condition (C) defines that the first group of materials in Condition (A) and the second group of materials in Condition (B) can be used in combination.

Although various materials are included as the first and second groups of materials in Conditions (A) and (B), the materials derived from animals or vegetables are preferably used. The use of such materials is preferred because the content of ingredients derived from biomass (i.e., biomass count) in the ink composition can be increased to contribute to an achievement of eco-friendly products.

[Coloring Agent]

Coloring agents can be added to the inventive ink composition as needed. The coloring agents are added to give, for example, staining and masking properties to the ink composition. The coloring agents include coloring pigments, white pigments, and metal powder. Examples of such coloring agents include, not limited to, organic and/or inorganic pigments commonly used in ink compositions. An inventive ink composition not containing coloring agents is preferably used in other applications, such as coating.

Examples of the coloring agents include disazo yellow pigments (Pigment Yellow 12, Pigment Yellow 13, Pigment Yellow 14, Pigment Yellow 17, and Pigment Yellow 1); yellow pigments, such as Hansa Yellow; magenta pigments, such as Brilliant Carmine 6B, Lake Red C, and Watching Red; cyan pigments, such as phthalocyanine blue, phthalocyanine green and alkali blue; black pigments, such as carbon black; white pigments, such as titanium oxide; and metal powder, such as aluminum paste and bronze powder.

The ink composition may contain, for example, about 1 to 30 mass % coloring agent, which content is not limited. In the preparation of a color ink composition, another coloring agent as a complementary color or another color ink composition can be used in combination.

[Other Ingredients]

The inventive ink composition may further contain any other ingredient, as needed, in addition to the ingredients described above. Examples of such ingredients include extender pigments, resin ingredients, polymerization inhibitors, dispersants, salts such as phosphates, waxes, such as polyethylene wax, olefin wax and Fischer-Tropsch wax, and alcohols.

The extender pigments impart appropriate properties, such as printability and viscoelasticity, to the ink composition, and various types of pigments generally used in the preparation of the ink composition can be used. Examples of such extender pigments include clay, kaolinite (kaolin), barium sulfate, magnesium sulfate, calcium carbonate, silicon oxide (silica), bentonite, talc, mica, and titanium oxide. The content of the extender pigment is, for example, about 0 to 33 mass % in the total ink composition, which content is not essential.

The resin ingredients impart appropriate properties, such as printability and viscoelasticity, to the ink composition. Such resin ingredients include various resins that have been conventionally used in the ink compositions, and preferably have compatibility with the monomers and oligomers. Examples of the resin ingredients include styrene-acrylic resins, acrylic resins, alkyd resins, rosin-modified phenol resins, rosin-modified maleic resins, rosin-modified alkyd resins, rosin-modified petroleum resins, rosin ester resins, petroleum resin-modified phenol resins, vegetable oil-modified alkyd resins, and petroleum resins.

The content of the resin ingredients in the ink composition is preferably 1 to 30 mass %, more preferably 1 to 20 mass %, and even more preferably 1 to 10 mass %. Such a range of content of the resin ingredients imparts appropriate viscoelasticity to the ink composition, suppresses an occurrence of misting, and preferably achieves high curability of the ink composition.

Examples of the polymerization inhibitors preferably include phenol compounds such as butylhydroxytoluene, tocopherol acetate, nitrosamine, benzotriazole, and hindered amine. More preferred is butylhydroxytoluene. The addition of such polymerization inhibitors to the ink composition can prevent an increase in viscosity of the ink composition caused by the progress of polymerization reaction during storage. The content of the polymerization inhibitors is, for example, about 0.01 to 1 mass % in the ink composition.

The dispersants are used to improve the state of dispersion of the coloring agents and extender pigments contained in the ink composition. Various types of dispersants are commercially available, for example, DISPERBYK™ series available from BYK Japan KK.

The inventive ink composition with the ingredients described above can be produced by a commonly known process. For example, such a process involves the following steps: mixing the ingredients; kneading the ingredients with, for example, a bead mill or a three-roll mill to disperse the pigments (i.e., the coloring agents and the extender pigments); optionally adding additives (e.g., polymerization inhibitors, alcohols and waxes); and then adjusting the viscosity by addition of monomer ingredients and oil ingredients. The viscosity of the ink composition measured with a Laray viscometer at 25° C. is, for example, 10 to 70 Pa·s, which value is not limited.

<Production of Printed Matter>

Another aspect of the present invention provides a method for manufacturing printed matter. The method is characterized in that the inventive active energy ray-curable ink composition for offset printing is used in printing. The inventive method for manufacturing printed matter is carried out by an ordinary lithographic offset printing technique. The lithographic offset printing used in the invention may be a water-base printing process with a dampening solution, or a waterless printing process without a dampening solution using a dedicated lithographic printing plate.

Irradiation of an undried printed matter manufactured by lithographic offset printing with active energy rays can cause the undried printed matter to instantaneously lead to a dry state. The drying is achieved by curing of the ink composition present on the surface of printed paper sheet through irradiation with active energy rays. Known rays, such as electron beams and ultraviolet rays, can be employed as the active energy rays, and ultraviolet rays are preferred from the viewpoint of installation costs and ease of operation of machines. In addition, the inventive ink composition provides attractive printed matter having superior gloss. It is understood that the resultant printed matter can be used not only for delivery of information or appreciation of pictures, but also in several applications, such as package printing.

<Enhancement in Gloss of Printed Matter>

In a printing process comprising the steps of printing with an active energy ray-curable ink composition for offset printing and then curing the ink composition by irradiation with active energy rays, a method of enhancing the gloss of the resultant printed matter printed with the ink composition that satisfies at least one of the Conditions (A), (B), and (C) is also an aspect of the scope of the present invention.

Condition (A): the ink composition contains 1 mass % to 80 mass % of the first group of materials exhibiting a liquid state at room temperature, the first group of materials consisting of compounds having no ethylenically unsaturated bonds and having an SP value of 9.0 $(cal/cm^3)^{1/2}$ to less than 11.0 $(cal/cm^3)^{1/2}$;

Condition (B): the ink composition contains 1 mass % to 20 mass % of the second group of materials exhibiting a liquid state at room temperature, the second group of materials consisting of compounds having no ethylenically unsaturated bonds and having an SP value of less than 9.0 $(cal/cm^3)^{1/2}$; and Condition (C): the total amount of the first group of materials in Condition (A) and the second group of materials in Condition (B) is 1 mass % or more in the entire composition, with the proviso that the contents of the first and second groups of materials in Condition (A) and Condition (B) do not exceed the respective upper limits in Condition (A) and Condition (B).

Conditions (A), (B), and (C) are the same as those in the description of the inventive active energy ray-curable ink composition for offset printing. As already described, the use of the inventive ink composition results in an enhancement in the gloss of printed matter as compared with the use of existing active energy ray-curable ink compositions. Accordingly, in the method of the present invention, the inventive ink composition is used in place of existing ink compositions for the purpose of enhancing the gloss of the printed matter. Since the details have already been described, redundant description is omitted in this paragraph.

EXAMPLES

The present invention will be described in further detail by way of the following examples, but the present invention should not be limited to these examples. In the following description, "%" indicates "mass %" and "parts" indicates "parts by mass" unless otherwise specified.

[Preparation of Varnish]

A mixture of poly(diallyl phthalate) (A-DAP, available from Osaka Soda Co., Ltd.) (20 parts by mass), ditrimethylolpropane tetraacrylate (DI-TMPTA) (79 parts by mass), and 1 mass % methylhydroquinone was heated at 100° C. for 60 minutes to prepare a varnish. The varnish was used for preparation of ink compositions described below.

[Preparation of Ink Composition]

Carbon black (MA-70, available from Mitsubishi Chemical Corporation), the varnish prepared above, trimethylolpropane triacrylate (TMPTA), ditrimethylolpropane tetraacrylate (DI-TMPTA), a photopolymerization Initiator Irgacure™ 907 (available from BASF SE), 4,4'-diethylaminobenzophenone (EAB, photopolymerization initiator), epoxidized soybean oil, various vegetable oils, and cashew nut shell oil (including modified derivatives and polymers) were mixed according to formulations shown in Tables 1 to 5 and then kneaded with a three-roll mill to prepare ink compositions of Examples 1 to 22 and Comparative Examples 1 to 9. The ink compositions of Examples 1 to 17 and 22 and Comparative Examples 1 to 8 each contained a color pigment, and the ink compositions of Examples 18 to 21 and Comparative Example 9 were of a varnish type containing no color pigment. The slope value (i.e., flowability) of each ink composition was measured, and the results were shown in the columns of slope value in Tables 1 to 5. In Tables 1 to 5, NX-2024, UL (UltraLITE) 2023, and NX-2026 are Cardolite™ series available from Cardolite Corporation, all of which are cashew nut shell oils (cardanol). LITE2020, NC-513, NC-514, and NC-514S are Cardolite™ series available from Cardolite Corporation, all of which are modified derivatives of cashew nut shell oil (cardanol).

[Evaluation of Gloss]

For evaluation of each ink composition of Examples and Comparative Examples, 0.1 cc of ink composition was spread on a coated paper sheet (Aurora coat, available from Nippon Paper Industries Co., Ltd.) with an RI drawdown machine (dual-split roll, available from Akira Co., Ltd.) and then cured by irradiation with 40 mJ/cm$^2$ of ultraviolet light. After curing, the gloss at 60° reflection on the spread surface was determined with a Murakami digital gloss meter (available from Murakami Color Research Laboratory). The results were shown in the columns of gloss value in Tables 1 to 5. The term "unspread" in the results indicates that the ingredients of the ink composition were separated during the test and the spreading was unsuccessful due to poor compatibility of ingredients in the ink composition.

TABLE 1

|  | Example 1 | Example 2 | Example 3 | Example 4 | Example 5 | Example 6 |
|---|---|---|---|---|---|---|
| Carbon black | 22 | 22 | 22 | 22 | 22 | 22 |
| Varnish | 30 | 30 | 30 | 30 | 30 | 30 |
| TMPTA |  | 10 | 20 | 10 | 10 | 10 |
| Castor oil | 30 | 20 | 10 |  |  |  |
| Coconut oil |  |  |  | 20 |  |  |
| NX-2024 |  |  |  |  | 20 |  |
| UL 2023 |  |  |  |  |  | 20 |
| Irgacure™ 907 | 12 | 12 | 12 | 12 | 12 | 12 |
| EAB | 6 | 6 | 6 | 6 | 6 | 6 |
| Total | 100 | 100 | 100 | 100 | 100 | 100 |
| Slope value | 6.2 | 6.4 | 6.3 | 5.8 | 6.1 | 6.2 |
| Gloss value | 50 | 45 | 40 | 46 | 45 | 45 |

TABLE 2

|  | Example 7 | Example 8 | Example 9 | Example 10 | Example 11 | Example 12 |
|---|---|---|---|---|---|---|
| Carbon black | 22 | 22 | 22 | 22 | 22 | 22 |
| Varnish | 30 | 30 | 30 | 30 | 30 | 30 |
| TMPTA | 10 | 10 | 10 | 10 | 10 | 10 |
| NX-2026 | 20 |  |  |  |  |  |
| LITE 2020 |  | 20 |  |  |  |  |
| NC-513 |  |  | 20 |  |  |  |
| NC-514 |  |  |  | 20 |  |  |
| NC-514S |  |  |  |  | 20 |  |
| Epoxidized soybean oil |  |  |  |  |  | 20 |
| Irgacure™ 907 | 12 | 12 | 12 | 12 | 12 | 12 |
| EAB | 6 | 6 | 6 | 6 | 6 | 6 |
| Total | 100 | 100 | 100 | 100 | 100 | 100 |
| Slope value | 6.1 | 6.2 | 6.2 | 6.1 | 6.1 | 6.2 |
| Gloss value | 46 | 46 | 48 | 45 | 47 | 45 |

TABLE 3

|  | Example 13 | Example 14 | Example 15 | Example 16 | Example 17 | Example 18 |
|---|---|---|---|---|---|---|
| Carbon black | 22 | 22 | 22 | 10 | 10 |  |
| Varnish | 30 | 30 | 30 | 42 | 22 | 32 |
| TMPTA |  | 10 |  |  |  |  |
| DI-TMPTA |  |  |  |  |  |  |
| NC-513 | 10 | 5 |  |  |  |  |
| NC-514 |  |  |  |  |  |  |
| Epoxidized soybean oil |  |  | 10 | 30 | 50 | 50 |
| Soybean oil | 10 | 15 | 10 |  |  |  |
| Irgacure™ 907 | 12 | 12 | 12 | 12 | 12 | 12 |
| EAB | 6 | 6 | 6 | 6 | 6 | 6 |
| Total | 100 | 100 | 100 | 100 | 100 | 100 |
| Slope value | 6.4 | 6.3 | 6.3 | 8.5 | 8.2 | 8.0 |
| Gloss value | 47 | 45 | 44 | 50 | 53 | 55 |

TABLE 4

|  | Example 19 | Example 20 | Example 21 | Example 22 | Comparative Example 1 | Comparative Example 2 |
|---|---|---|---|---|---|---|
| Carbon black |  |  |  | 22 | 22 | 22 |
| Varnish | 22 |  |  | 30 | 30 | 30 |
| TMPTA |  | 22 | 10 |  |  | 10 |
| DI-TMPTA |  |  |  |  | 30 | 20 |
| NC-513 |  |  |  |  |  |  |
| Epoxidized soybean oil | 60 | 60 | 80 |  |  |  |
| Soybean oil |  |  |  | 20 |  |  |
| linseed oil |  |  |  |  |  |  |
| Irgacure ™ 907 | 12 | 12 | 10 | 17 | 12 | 12 |
| EAB | 6 | 6 |  | 11 | 6 | 6 |
| Total | 100 | 100 | 100 | 100 | 100 | 100 |
| Slope value | 9.0 | 10.0 | 11.0 | 11.2 | 6.4 | 6.4 |
| Gloss value | 60 | 65 | 70 | 42 | 20 | 22 |

TABLE 5

|  | Comparative Example 3 | Comparative Example 4 | Comparative Example 5 | Comparative Example 6 | Comparative Example 7 | Comparative Example 8 | Comparative Example 9 |
|---|---|---|---|---|---|---|---|
| Carbon black | 22 | 22 | 22 | 22 | 22 | 22 |  |
| Varnish | 30 | 30 | 30 | 30 | 30 | 30 |  |
| TMPTA | 20 | 5 | 29.5 | 29.5 | 5 | 5 | 90 |
| DI-TMPTA | 10 | 25 |  |  |  |  |  |
| NC-513 |  |  | 0.5 |  |  |  |  |
| Epoxidized soybean oil |  |  |  | 0.5 |  |  |  |
| Soybean oil |  |  |  |  | 25 |  |  |
| linseed oil |  |  |  |  |  | 25 |  |
| Irgacure ™ 907 | 12 | 12 | 12 | 12 | 12 | 12 | 10 |
| EAB | 6 | 6 | 6 | 6 | 6 | 6 |  |
| Total | 100 | 100 | 100 | 100 | 100 | 100 | 100 |
| Slope value | 6.1 | 6.4 | 6.2 | 6.1 | 2.0 | 1.5 | 11.0 |
| Gloss value | 21 | 22 | 20 | 19 | Unspread | Unspread | 45 |

Referring to Tables 1 to 5, the ink compositions of Examples 1 to 12 and 16 to 17 containing the first group of materials satisfying Condition (A) in the present invention and containing the coloring pigment have superior gloss values compared to the ink compositions of Comparative Examples 1 to 8 containing the coloring pigment. In addition, the ink compositions of Examples 18 to 21 containing the first group of materials satisfying Condition (A) in the present invention and containing no coloring pigment also have superior gloss values compared to the ink composition of Comparative Example 9 containing no coloring pigment. Similarly, the ink composition of Example 22 containing the second group of materials satisfying Condition (B) in the present invention and containing the color pigment also has a superior gloss value compared to the ink compositions of Comparative Examples 1 to 8 containing the color pigment. The ink compositions of Examples 13 to 15 containing the first group of materials satisfying Condition (A) and 20 mass % or less second group of materials satisfying Condition (B) in the present invention and containing the coloring pigment also have superior gloss values compared to the ink compositions of Comparative Examples 1 to 8 containing the color pigment. The ink compositions of Examples 13 to 15 satisfy Condition (C) in the present invention.

In contrast, the ink compositions of Comparative Examples 5 and 6 containing less than 1 mass % first group of material satisfying Condition (A) in the present invention have low gloss values. The ink compositions of Comparative Examples 7 and 8 containing more than 20 mass % second group of material satisfying Condition (B) in the present invention have poor compatibility and could not be spread.

The invention claimed is:

1. An active energy ray-curable ink composition for offset printing, comprising:
   a compound having at least one ethylenically unsaturated bond; and
   a photopolymerization initiator, wherein
   the active energy ray-curable ink composition satisfies a Condition (A), which is that the ink composition contains 1 mass % to 80 mass % of a group of materials exhibiting a liquid state at room temperature, the group of materials consisting of compounds having no ethylenically unsaturated bonds and having an SP value of 9.0 $(cal/cm^3)^{1/2}$ to less than 11.0 $(cal/cm^3)^{1/2}$, and
   the group of materials comprises at least one material selected from the group consisting of epoxidized fatty acids, alkylphenols each having a C15-C18 alkyl group, cashew nut shell liquid, polymers of cashew nut shell liquid, and modified derivatives of cashew nut shell liquid.

2. The active energy ray-curable ink composition for offset printing according to claim 1, wherein the active energy ray-curable ink composition satisfies Condition (A) and contains 3 mass % to 30 mass % of the group of materials.

3. The active energy ray-curable ink composition for offset printing according to claim 1, wherein the active energy ray-curable ink composition satisfies Condition (A) and the group of materials comprises animal or vegetable fat or oil or modified products thereof.

4. A method for producing printed matter, comprising printing with the active energy ray-curable ink composition for offset printing according to claim 1.

* * * * *